United States Patent Office 3,214,483
Patented Oct. 26, 1965

3,214,483
PRODUCTS OF THE REACTION OF AN ALLENE WITH A CYCLOPENTADIENE
Harry Norman Cripps, Hockessin, Del., assignor to E. I. du Pont de Nemours and Company, Wilmington, Del., a corporation of Delaware
No Drawing. Filed Sept. 30, 1959, Ser. No. 843,361
12 Claims. (Cl. 260—666)

This is a continuation-in-part of U.S. application Serial No. 532,376, filed September 2, 1955, by H. N. Cripps, now U.S. Patent No. 2,914,541.

This invention relates to cyclic organic compounds. More particularly it relates to novel, unsaturated, cyclic organic compounds useful for the production of polymers and to a method for their preparation.

Unsaturated compounds have certain properties which make them useful in various applications. One such property which is responsible for their widespread commercial use, is the ability of many unsaturated compounds to be polymerized to valuable high molecular weight products. While the known polymers have many characteristics which are desirable for use in various applications, there are some applications in which polymers having certain specific properties or combinations of properties would have increased utility.

This invention has as an object the preparation of new unsaturated compounds which can be polymerized by cationic initiators to polymers, including both homopolymers and copolymers with other copolymerizable monomers, that are useful in various applications. Such polymers are particularly useful as self-supporting films and in coating compositions.

These objects are accomplished by the present invention of an adduct of an allene having two hydrogen atoms on at least one of the terminal allene carbons with an equimolar amount of a cyclopentadiene.

The products resulting from the addition of one mole of the allene to one mole of the cyclopentadiene are bicyclo[2.2.1]hept-2-enes which are substituted in the 5-position with an alkylidene group.

The compounds of the invention may be described by the following structural formula

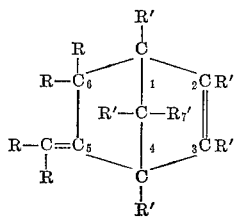

wherein each R represents hydrogen or a monovalent hydrocarbon radical (preferably alkyl) of from 1-6 carbon atoms, with the proviso that both R's on a single carbon are hydrogen when an R on the other carbon is hydrocarbon; and each R' represents hydrogen or a lower alkyl group. Preferably the R''s are hydrogen.

To obtain the products of the invention, an allene of the formula

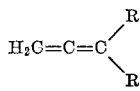

in which R represents hydrogen or monovalent hydrocarbon radical, preferably alkyl of 1-6 carbon atoms, and the R's can be the same or different, is heated in the absence of a polymerization initiator with a cyclopentadiene of the formula

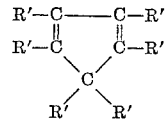

in which R' is hydrogen or a lower alkyl group, preferably alkyl of 1-6 carbons, and the R''s can be the same or different, at a temperature of 150–250° C.

Preferably the reaction is carried out at a temperature of 175°–225° C. and still more preferably above 200° C. and in the presence of an addition polymerization inhibitor. The broad temperature operating range is generally between about 150° and 250° C.

The pressure under which this reaction is carried out is not critical. Good results are obtained when the reactants are heated in a closed container under the autogenous pressure developed by the reactants under the operating conditions.

The reaction vessel can be constructed of any material which is inert to the reactants and is capable of withstanding the operating pressures. Reaction vessels made of glass, stainless steel and glass-lined steel are quite satisfactory.

The reaction time can be varied widely. Times ranging from 2–24 hours or more at 150° C. to 250° C. are operable. Very good results are obtained in reaction periods ranging from 4–16 hours.

Reactants which are commercially available in the grades used for polymerization are satisfactory for use in the process of this invention. However, best results are obtained when the allene is relatively pure.

The process and product of this invention are illustrated in further detail in the following examples in which the proportions of ingredients are expressed in parts by weight unless otherwise noted.

*Example I.—Preparation of 5-methylenebicyclo[2.2.1]hept-2-ene*

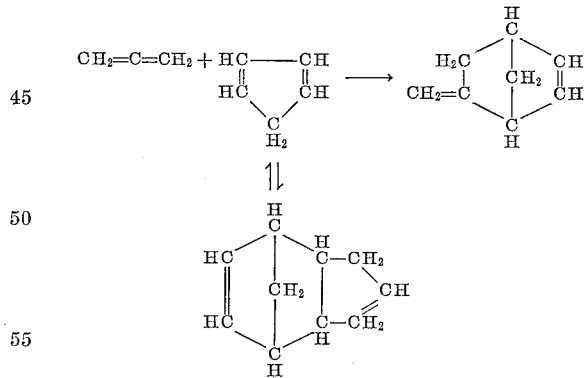

A mixture of 99.1 parts of dicyclopentadiene (which at the operation temperature of 200° C. is partially in the form of monomeric cyclopentadiene), 63 parts of pentane, 3.0 parts of hydroquinone and 60 parts of allene is heated under autogenous pressure at 200° C. for 6 hours. The liquid reaction product is freed from pentane and cyclopentadiene by distillation, and there is obtained on fractional distillation at reduced pressure 69 parts of 5-methylenebicyclo[2.2.1]hept-2-ene boiling at 55–56° C./95 mm. and having a refractive index, $n_D^{25}$, of 1.4834.

*Analysis.*—Calcd. for $C_8H_{10}$: C, 90.5%; H, 9.5%; quant. hydrog., 0.0377 g. $H_2$/g. sample. Found: C, 90.55%, 90.25%; H, 9.57%, 9.50%; quant. hydrog., 0.0385, 0.0382 g. $H_2$/g. sample.

The proton magnetic resonance spectrum obtained indicates that the product has the above structure.

In addition to allene used in the example, any allene of the formula

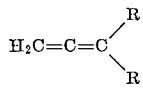

in which R is hydrogen or a monovalent hydrocarbon group, preferably alkyl, of up to 6 carbons can be used. Thus there may be used 1,1-dimethylallene, 1-methylallene, 1-phenylallene, 1,1-diethylallene, and 1,1-di-n-hexylallene.

The cyclopentadiene which may be used as the other reactant may be substituted with hydrocarbon groups, preferably lower alkyl groups. Thus in place of cyclopentadiene in the above example, there may be used 5,5-dimethylcyclopentadiene, 5-methylcyclopentadiene, 5-propylcyclopentadiene, 1,5,5 - trimethylcyclopentadiene, 2,5,5-trimethylcyclopentadiene, and 5-isopropylcyclopentadiene.

Illustrative of the 5-alkylidenebicyclo[2.2.1]hept-2-enes which may be produced in accordance with the present invention are 5-isopropylidene - 7-methylbicyclo[2.2.1]hept-2-ene,
5 - methylene-6,7,7-trimethylbicyclo[2.2.1]hept-2-ene,
5 - methylene - 6-phenyl-7,7-dimethylbicyclo[2.2.1]hept-2-ene,
5 - methylene - 6,6-diethyl-7-n-propylbicyclo[2.2.1]hept-2-ene,
5 - methyl - 6,6-di-n-hexyl-7-methylbicyclo[2.2.1]hept-2-ene,
5 - methylene - 1,7,7-trimethylbicyclo[2.2.1]hept-2-ene,
5 - ethylidene - 2,7,7-trimethylbicyclo[2.2.1]hept-2-ene, and
5 - isopropylidene - 7-isopropylbicyclo[2.2.1]hept-2-ene.

As mentioned previously, the novel compounds of the invention are suitable for the production of polymers finding use in self-supporting films and coating compositions. Illustrative of this utility are the following:

*Example II*

A reaction vessel is charged with 13 g. of freshly distilled 5-methylenebicyclo[2.2.1]hept-2-ene (B.P. 115.5–116.5° C.) and cooled to approximately −80° C. under a nitrogen atmosphere and 25 ml. of gaseous boron trifluoride is added. Polymerization begins immediately at the surface of the monomer. After a total polymerization time of 5 minutes, the polymer is isolated and washed with methanol and then dried. There is obtained 1.0 g. of a white, fibrous solid polymer.

*Example III*

A solution of 4.35 g. of 5-methylenebicyclo[2.2.1]hept-2-ene dissolved in 16 g. of pentane is placed in a reaction vessel and cooled to approximately −80° C. Five milliliters of gaseous boron trifluoride is added and the polymerization is allowed to proceed for 25 minutes at approximately −80° C. The polymer which precipitates is filtered from the reaction mixture, washed with methanol and dried. There is obtained 2.83 g. of solid, white polymer of 5-methylenebicyclo[2.2.1]hept-2-ene. This polymer can be pressed at 200° C. under a pressure of 12,000–13,000 lb./sq. in to clear, tough films. The films are useful in the customary applications where transparent self-supporting films are employed.

*Example IV*

A reaction vessel is charged with 19 g. of methylene chloride and 0.1 g. of stannic chloride and cooled to −40 to −50° C. Monomeric 5-methylenebicyclo[2.2.1]hept-2-ene (4.35 g.) is added to the reaction mixture slowly with stirring. Polymerization takes place rapidly over a 15-minute period. The resulting polymer is filtered from the reaction mixture, washed with methanol and dried. There is obtained 4.0 g. of white solid polymer of 5-methylenebicyclo[2.2.1]hept-2-ene. This polymer can be pressed at 175–200° C. under a pressure of 10,000–13,000 lb./sq. in. to slightly hazy films. The polymer is soluble in hot toluene and the resulting toluene solution can be used as a coating composition for application to wood and metal surfaces.

The 5-alkylidenebicyclo[2.2.1]hept-2-enes of this invention can be polymerized by means of cationic initiators as illustrated above. In addition to the specific initiators mentioned previously, aluminum chloride can also be used.

The 5-alkylidenebicyclo[2.2.1]hept-2-enes of this invention can also be copolymerized with other copolymerizable monomers by means of cationic initiators. For example, they can be copolymerized with acrylic and methacrylic acids and their derivatives such as esters amides, nitriles and anhydrides, e.g., ethyl arcrylate, methyl methacrylate, methacrylic anhydride and methacrylamide. They can also be copolymerized with butene-dioic acids and their derivatives such as esters, nitriles and anhydrides, e.g., maleic anhydride.

As many apparently widely different embodiments of this invention may be made without departing from the spirit and scope thereof, it is to be understood that this invention is not limited to the specific embodiments thereof except as defined in the appended claims.

What is claimed is:

1. A compound of the following structural formula:

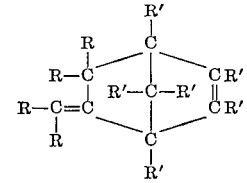

wherein each R is selected from the group consisting of hydrogen, and monovalent hydrocarbon radicals of from 1–6 carbon atoms with the proviso that both R's on a single carbon are hydrogen when an R on the other carbon is hydrocarbon; and each R' is selected from the group consisting of hydrogen and lower alkyl groups.

2. Compounds according to claim 1 wherein each R' is hydrogen.
3. A 5-alkylidenebicyclo[2.2.1]hept-2-ene.
4. 5-methylenebicyclo[2.2.1]hept-2-ene.
5. Polymers of 5-alkylidenebicyclo[2.2.1]hept-2-enes.
6. Polymeric 5-methylenebicyclo[2.2.1]hept-2-ene.
7. A method of making the compound of claim 1 which comprises reacting an allene of the formula

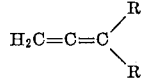

in which R represents a member of the group consisting of hydrogen and monovalent hydrocarbon radicals with a cyclopentadiene of the formula

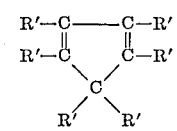

in which R' is selected from the group consisting of hydrogen and lower alkyl radicals at a temperature of from about 150° C. to 250° C.

8. The process of claim 7 wherein the reaction is carried out at a temperature of from about 175° C. to 225° C.

9. A method for making 5-methylenebicyclo[2.2.1]hept-2-ene which comprises reacting cyclopentadiene with allene.

10. A process for preparing a cyclic compound represented by the following general formula:

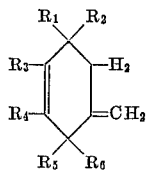

wherein $R_2$, $R_3$, $R_4$ and $R_5$ each represents a member selected from the group consisting of a hydrogen atom and an alkyl group of from 1–4 carbon atoms, and wherein $R_1$ and $R_6$ together represent a —$C(R)_2$— bridge group wherein R stands for a member selected from the group consisting of a hydrogen atom and an alkyl group of 1–4 carbon atoms, which comprises heating allene with a diene selected from the group consisting of dicyclopentadiene and a compound represented by the general formula:

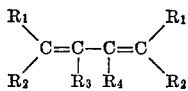

wherein $R_2$, $R_3$, $R_4$, $R_5$ and $R_1$ and $R_6$ together have the above defined meanings, at 150–250° C., and separating the said cyclic compound from the reaction mixture.

11. A process for preparing a cyclic compound represented by the following general formula:

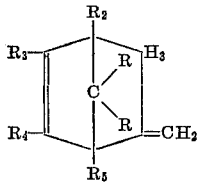

wherein R, $R_2$, $R_3$, $R_4$ and $R_5$ each represents a member selected from the group consisting of a hydrogen atom and an alkyl group of 1–4 carbon atoms, which comprises heating allene with a diene compound represented by the following general formula:

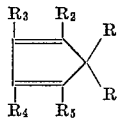

wherein R, $R_2$, $R_3$, $R_4$ and $R_5$ each have the above defined meanings, at 150–250° C., and separating the said cyclic compound from the reaction mixture.

12. A process for preparing 6-methylenebicyclo[2.2.1]-hept-2-ene which comprises heating allene with dicyclopentadiene, at 150–250° C., and separating the said 6-methylenebicyclo[2.2.1]hept-2-ene from the reaction mixture.

References Cited by the Examiner

UNITED STATES PATENTS 2,960,541  11/60  Elam et al. _____ 260—648

FOREIGN PATENTS 701,211  12/53  Great Britain.

ALPHONSO D. SULLIVAN, *Primary Examiner.*

ALLAN M. BOETTCHER, *Examiner.*